(12) United States Patent
Forgang et al.

(10) Patent No.: US 8,299,797 B2
(45) Date of Patent: Oct. 30, 2012

(54) METHOD AND APPARATUS FOR WELL LOGGING RESISTIVITY IMAGE TOMOGRAPHY

(75) Inventors: Stanislav Wilhelm Forgang, Houston, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 496 days.

(21) Appl. No.: 12/462,285

(22) Filed: Jul. 30, 2009

(65) Prior Publication Data

US 2011/0025336 A1    Feb. 3, 2011

(51) Int. Cl.
*G01V 3/00* (2006.01)

(52) U.S. Cl. ........ 324/367; 324/373; 324/374; 324/375; 324/368

(58) Field of Classification Search ........... 324/339–375
See application file for complete search history.

(56) References Cited

U.S. PATENT DOCUMENTS

| | | | |
|---|---|---|---|
| 3,105,191 A | 9/1963 | Schopper | |
| 3,973,181 A | 8/1976 | Calvert | |
| 4,293,934 A * | 10/1981 | Herolz et al. | 367/27 |
| 5,012,193 A | 4/1991 | Chen | |
| 5,502,686 A | 3/1996 | Dory et al. | |
| 5,563,513 A | 10/1996 | Tasci et al. | |
| 5,923,170 A | 7/1999 | Kuckes | |
| 6,060,885 A | 5/2000 | Tabarovsky et al. | |
| 6,089,521 A | 7/2000 | Tarusawa et al. | |
| 6,191,588 B1 | 2/2001 | Chen | |
| 6,348,796 B2 | 2/2002 | Evans et al. | |
| 6,600,321 B2 | 7/2003 | Evans | |
| 6,891,377 B2 | 5/2005 | Cheung et al. | |
| 7,066,282 B2 | 6/2006 | Chen et al. | |
| 7,242,194 B2 | 7/2007 | Hayman et al. | |
| 7,365,545 B2 | 4/2008 | Itskovich et al. | |
| 7,385,401 B2 | 6/2008 | Itskovich et al. | |
| 7,394,258 B2 | 7/2008 | Itskovich et al. | |
| 7,397,250 B2 | 7/2008 | Bespalov et al. | |
| 7,888,941 B2 | 2/2011 | San Martin et al. | |
| 2004/0051531 A1 | 3/2004 | Chemali et al. | |
| 2004/0245991 A1 | 12/2004 | Hayman et al. | |
| 2005/0067190 A1 * | 3/2005 | Tabanou et al. | 175/50 |
| 2007/0152671 A1 * | 7/2007 | Itskovich et al. | 324/367 |

(Continued)

OTHER PUBLICATIONS

Notification of Transmittal to International Preliminary Report on Patentability, for international Application No. PCT/US08/65903. Mailed Sep. 17, 2009.

(Continued)

*Primary Examiner* — Reena Aurora
*Assistant Examiner* — Son Le
(74) *Attorney, Agent, or Firm* — Cantor Colburn LLP

(57) ABSTRACT

A method and apparatus for evaluating an earth formation penetrated by a borehole comprises taking resistivity measurements using a plurality of resistivity arrays or pads positioned within the borehole proximal the borehole wall. In one embodiment, pads are spaced apart azimuthally around the perimeter of a tool body, each pad carrying at least one electrode thereon. A sequence of resistivity measurement operations are performed involving sequentially operating each pad, in turn, as a transmitter, with remaining pads and electrodes operated as return electrodes. The sequence preferably involves a succession of adjacent pads around the perimeter of the tool body, resulting in a full rotational (360°) imaging of the formation penetrated by the borehole. In one embodiment, the pads include at least two electrodes spaced vertically apart from one another, such that helical current paths are defined between transmitting electrodes and return electrodes.

15 Claims, 5 Drawing Sheets

U.S. PATENT DOCUMENTS

2007/0279063 A1    12/2007    Beard
2008/0303525 A1    12/2008    Itskovich et al.

OTHER PUBLICATIONS

Cheung, et al. "A Clear Picture in Oil-Base Muds". Oilfield Review. Winter 2001/2002. pp. 2-27.
Pavlovic, et al. "Field Test Results of a New Oil-Based Micro-Resistivity Imaging Instrument in Canada". pp. 1-11.
Pavlovic, et al. "A New Approach for Interpreting Lithofacies and Sequence Stratigraphy using Borehole Image Data in Wells Drilled with Non-conductive Mud Systems". AAPG Annual Convention, Salt Lake City, Utah. May 11-14, 2003.
Notification of Transmittal of the International Search report and the Written Opinion of the Internatinoal searching Authority, or the Declaration, PCT/US2010/027655; Mailed Oct. 25, 2010.
International Search Report for International Application No. PCT/US08/65903. Mailed Aug. 26, 2008.
Written Opinion of the International Searching Authority for International Application No. PCT/US08/65903. Mailed Aug. 26, 2008.

* cited by examiner

METHOD AND APPARATUS FOR WELL LOGGING RESISTIVITY IMAGE TOMOGRAPHY

FIELD OF THE INVENTION

The present invention relates generally to measurement tools used in hydrocarbon exploration and production, and more particularly to a measurement tool for borehole resistivity measurements.

BACKGROUND OF THE INVENTION

Electrical borehole logging is well known in the field of hydrocarbon (oil and gas) exploration and production, and various devices and various techniques have been described for such purposes. Broadly speaking, there are two categories of devices used in electrical logging. In the first category, transmitter or source electrodes (current sources) are employed in conjunction with receiver or sink electrodes (which may be separate isolated contacts or may comprise part of the mandrel or tool body or an extension thereof). An electrical current flows in a circuit that connects a current source to the transmitter electrodes, through the earth formation to the return electrodes. In a second category, that of inductive measuring tools, one or more antennas of the measuring instrument induces a current flow within the earth formation. The magnitude of the induced current is detected using one or more receiver antennas.

There are different known modes of operation among typical borehole resistivity measurement devices. In one known mode, the current at the measuring electrode is maintained at a constant level and a voltage is measured, while in a second mode, the voltage of the electrode is fixed and the current flowing from the electrode is measured. Ideally, it is desirable that if the current is varied to maintain constant voltage at a monitor electrode, the current is inversely proportional to the resistivity of the earth formation being investigated. Conversely, it is desirable that if the current is maintained constant, the voltage measured at a monitor electrode is proportional to the resistivity of the earth formation being investigated. Those of ordinary skill in the art will appreciate the Ohm's law relation that if both current and voltage vary, the resistivity of the earth formation is proportional to the ratio of the voltage to the current.

Of course, the foregoing is a highly simplified and idealized description of physical relationships that are more complex in practical application. Those of ordinary skill in the art will appreciate that there are usually other variables to consider, for example the electrical characteristics of the instrumentation itself and the electrical characteristics of the environment under investigation. The prior art suggests innumerable approaches for addressing such non-idealized factors.

U.S. Pat. No. 7,365,545 to Itskovich et al., for example, entitled "Two Axial Pad Formation Resistivity Imager," proposes and arrangement whereby current is injected in two orthogonal directions to assess both horizontal and vertical resistivity in the formation under investigation.

U.S. Pat. No. 6,060,885 to Tabarovsky et al., entitled "Method and Apparatus for Determining the Resistivity and Conductivity of Geological Formations Surrounding a Borehole," proposes using a plurality of vertically spaced-apart return electrodes in conjunction with a source electrode, in order to provide a resistivity/conductivity profile over an increasing radial depth of investigation.

U.S. Pat. No. 7,385,401 to Itskovich et al., entitled "High Resolution Resistivity Earth Imager," proposes taking measurements of the standoff distance between an electrode and the borehole wall, in order to account for the electrical characteristics of the drilling fluid (oil based or water based) present between the electrode and the borehole wall. Similarly, U.S. Pat. No. 7,394,258 to Itskovich et al., entitled "High Resolution Resistivity Earth Imager," proposes taking into account the electrical conductivity and dielectric constant of drilling fluid in the borehole to increase the accuracy of formation resistivity measurements.

U.S. Pat. No. 7,397,250 to Bespalov et al., entitled "High Resolution Resistivity Earth Imager," contemplates resistivity measurements taken at multiple frequencies to account for tool standoff and the resistivity and dielectric constant of drilling fluid.

U.S. Pat. No. 6,348,796 to Evans et al., entitled "Image Focusing Method and Apparatus for Wellbore Resistivity Imaging" proposes the use of focused electrodes for resistivity measurements.

In the '796 patent, there is disclosed an apparatus that includes an array of measure electrodes separated from a pad or the body of the instrument by focus electrodes, the pad or body acting as the guard electrode. The focus electrode is maintained at a slightly lower potential than the pad, and the measure electrode is at an intermediate potential. With this arrangement, the current from the measure electrode initially diverges as it enters the formation, then converges (focuses), and then finally diverges again to define a depth of investigation. This arrangement is understood to reduce the instruments' sensitivities to borehole rugosity (i.e., variability and uncertainty in the distance between an electrode and the borehole wall).

The use of focusing electrodes is also discussed in U.S. Pat. No. 6,060,885 to Tabarovsky et al., entitled "Apparatus and Method for Wellbore Resistivity Determination and Imaging Using Capacitive Coupling."

The aforementioned U.S. Pat. No. 7,397,250 to Bespalov et al., U.S. Pat. No. 7,385,401 to Itskovich et al., U.S. Pat. No. 7,365,545 to Itskovich et al., U.S. Pat. No. 6,600,321 to Evans, U.S. Pat. No. 6,348,796 to Evans et al., and U.S. Pat. No. 6,060,885 to Tabarovsky et al., are each incorporated by reference herein in their respective entireties.

In typical borehole resisitivity measuring instruments, such as disclosed in the aforementioned Evans '321 patent or the Itskovich '545 patent, there are a plurality of resistivity arrays, or pads, azimuthally spaced apart around the circumference of the tool body (mandrel). Each array comprises a pad surrounding one or more measurement electrodes (transmit and return) and, possibly, one or more focusing electrodes. There may be, for example, four or six separate resistivity arrays disposed around the circumference of the instrument. As a practical matter, the more arrays provided, the smaller each array must be in order for all arrays to physically fit around the circumference of the array. The fewer arrays provided, the less sensitive the instrument is likely to be to azimuthal variation in the electrical characteristic(s) under investigation.

SUMMARY OF THE INVENTION

The present invention is directed to a method and apparatus for logging resistivity imaging in well boreholes filled with water-based or oil-based drilling fluid (mud). In accordance with one aspect of the invention, a downhole tool utilizes azimuthal or helical current injection and receiving, using pads (electrodes) generally disposed in a common plane, and with each pad preferably having at least two electrodes spaced vertically apart from one another.

In one embodiment of the invention, the pads are utilized sequentially, with each pad in sequence acting as a transmitter (current source) with the remaining pads serving as returns (current sinks). The sequential operation allows for acquiring a "rotating" resistivity image (tomography), thus providing quasi-360° borehole wall coverage. Helical current injection in combination with straight (azimuthal or vertical) injection can improve the measurement device's sensitivity to layered variations in the formation.

BRIEF DESCRIPTION OF THE DRAWINGS

The present invention is best understood with reference to the following detailed description of embodiments of the invention when read in conjunction with the attached drawings, in which like numerals refer to like elements, and in which.

DETAILED DESCRIPTION OF A PREFERRED EMBODIMENT OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts might be complex and time-consuming, outside the knowledge base of typical laymen, but would nevertheless be a routine undertaking for those of ordinary skill in the relevant fields.

Figure 1:
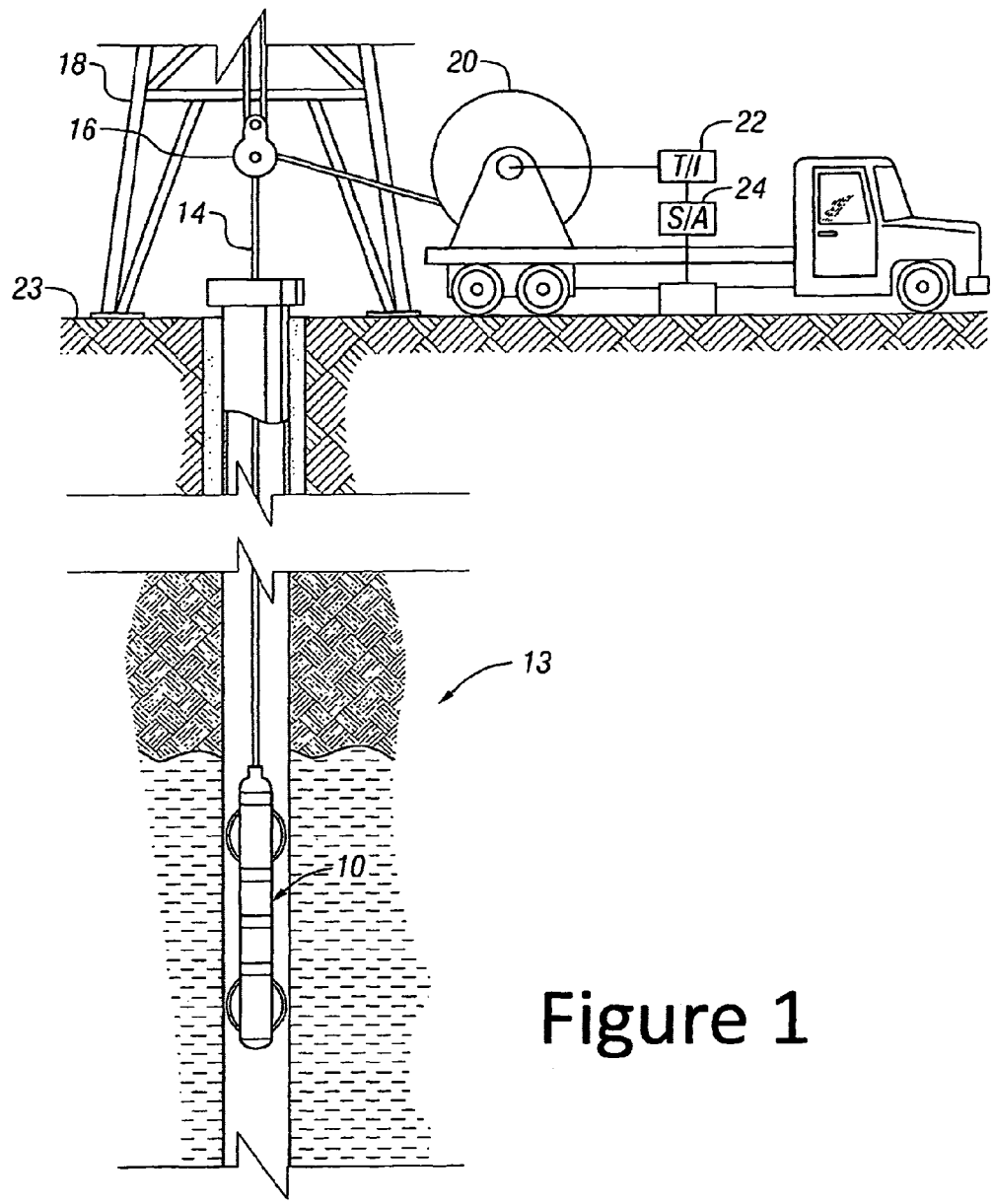
FIG. 1 is a functional diagram of a drilling site including a downhole tool for earth formation evaluation.

FIG. 1 shows an exemplary imaging tool 10 suspended in a borehole 12, that penetrates earth formations such as 13, from a suitable cable 14 that passes over a sheave 16 mounted on drilling rig 18. By industry standard, the cable 14 includes a stress member and a plurality of conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

Figure 2:
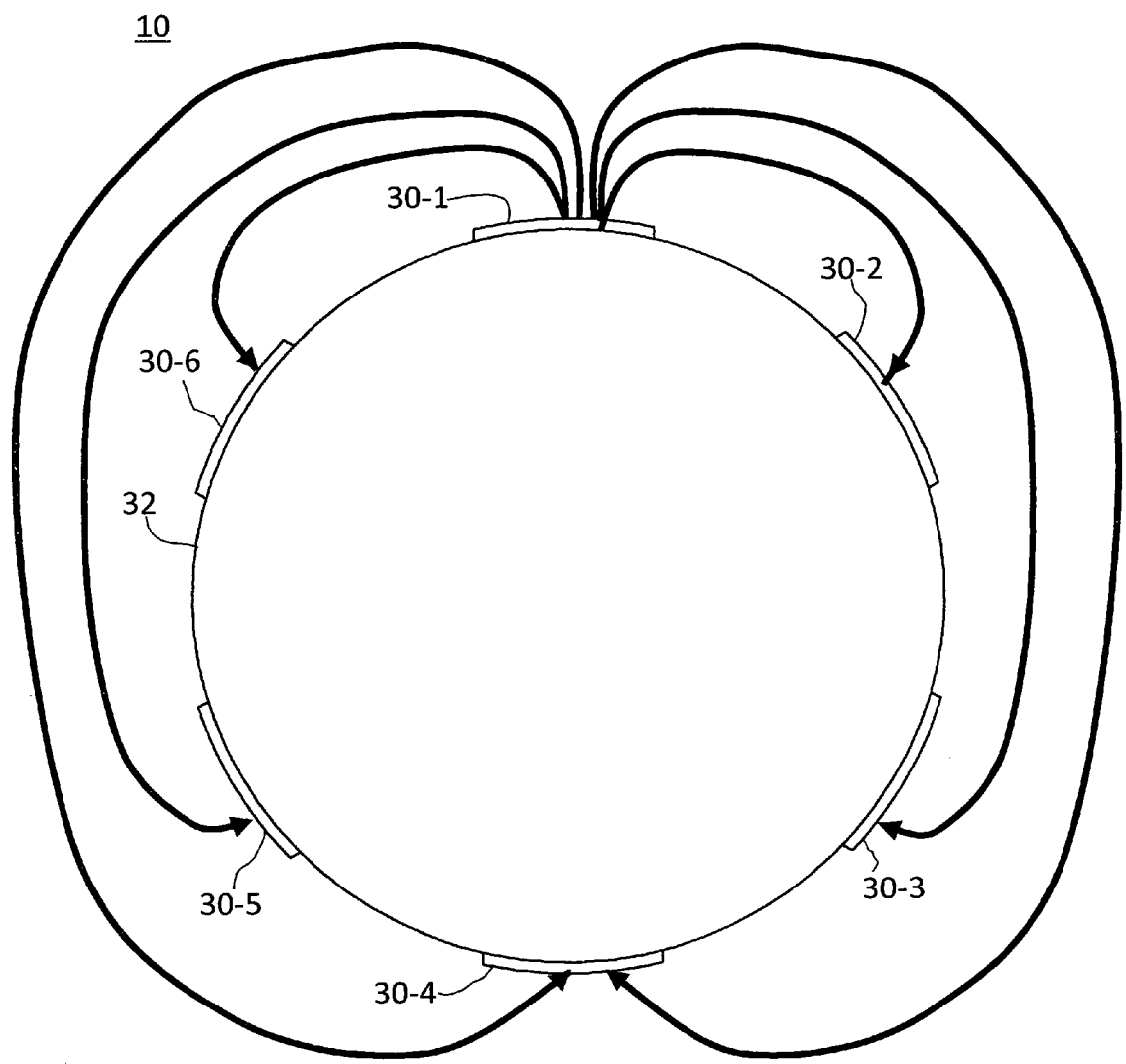
FIG. 2 is a top view of a tool for downhole earth formation evaluation in accordance with one embodiment of the invention.

FIG. 2 is a perspective view of a portion of a downhole tool functional as a borehole sidewall imager system. The portion of tool 10 comprising the imager system includes a plurality of resistivity arrays or pads 30-1 through 30-6 (collectively, "pads 30" or "arrays 30"). Those of ordinary skill in the art will recognize that the entire tool 10 may optionally include other functional components, as described, for example, in the above-referenced Itskovich '545 patent. Among these are electronics modules located at suitable locations on or within the tool 10, as would be understood by those or ordinary skill in the art. The tool's components may be mounted on a mandrel 32 in a conventional and well-known manner. The outer diameter of the assembly in one embodiment may be on the order of 5 inches and the entire tool 10 itself may be about fifteen feet long. One portion of tool 10 preferably contains a telemetry module for sampling, digitizing and transmission of the data samples from the various components uphole to surface electronics 22 in a conventional manner.

With reference to FIG. 2, the resistivity measurement tool 10 in accordance with the presently disclosed embodiment includes a plurality of resistivity arrays or pads 30 azimuthally spaced apart around the tool body or mandrel 32. In the embodiment depicted in FIGS. 1 and 2, a total of six pads 30-1 through 30-6 are substantially azimuthally and evenly spaced apart around the circumference of mandrel 32. It will be understood by persons of ordinary skill in the art having the benefit of the present disclosure that alternative embodiments may include more or fewer resistivity arrays 30. Those of ordinary skill in the art will further appreciate that if more resistivity arrays (pads) are provided, higher azimuthal resolution of the resulting measurements can be achieved, but the pads must be spaced closer together and/or relatively narrower, whereas if fewer pads 30 are provided, they can be larger and/or spaced further apart, but the azimuthal resolution of the resulting measurements will be diminished. That is, the number, size, and azimuthal spacing of arrays or pads 30 are implementation-specific parameters that can vary from implementation to implementation of the invention.

Figure 3:
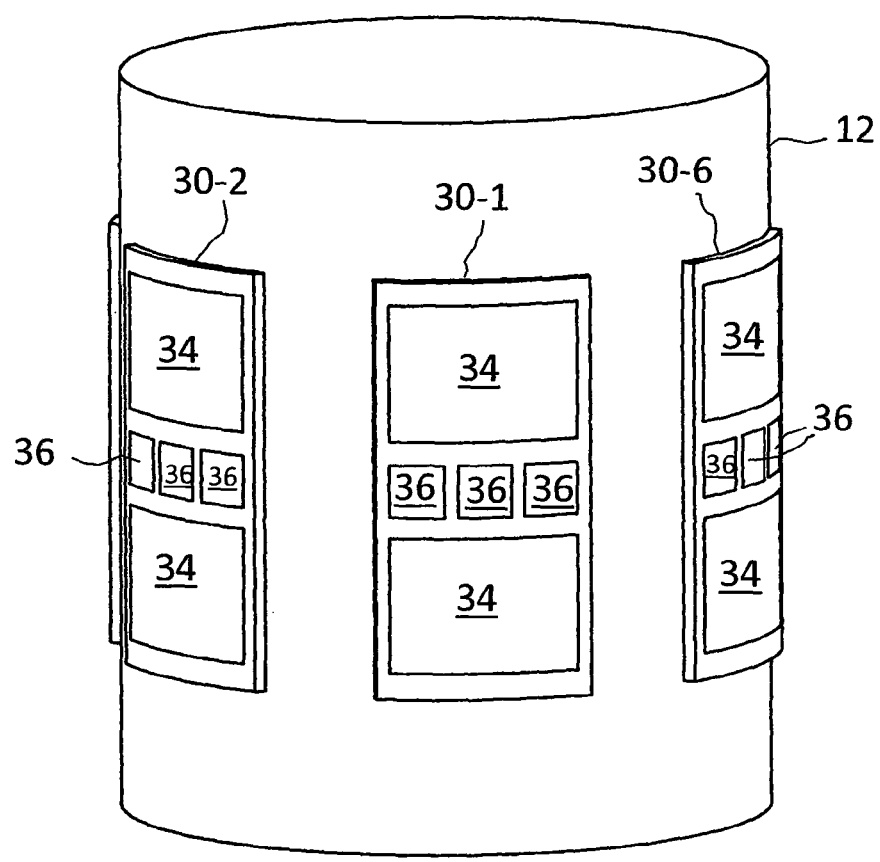
FIG. 3 is a perspective view of a portion of the downhole tool from FIG. 2 including a plurality of resistivity electrode arrays or pads disposed around the body of the tool.

With reference particularly to FIG. 3, it can be observed that each resistivity array or pad 30 has disposed thereon a plurality of electrically separate electrodes. In the disclosed embodiment, each pad 30 includes top and bottom electrodes 34 spaced vertically apart from one another, and a plurality of button electrodes 36 spaced azimuthally apart, vertically in between top and bottom electrodes 34. (By convention, "vertical" refers to the direction along the long axis of the borehole and "horizontal" refers to a plane perpendicular to vertical.)

Those of ordinary skill having the benefit of the present disclosure will recognize that the exact size and configuration of the plurality electrodes on each pad 30 may vary from implementation to implementation. For example, there may be more than one top electrode 34 and/or bottom electrode 34, and there may be greater or fewer than three intermediate button electrodes 36. In accordance with one aspect of the invention, it is preferred to have at least two electrodes on each pad that are spaced vertically apart from one another. This arrangement allows for a helical path to be established between one electrode on one pad 30 and another electrode on another pad 30, the latter being spaced apart both vertically and azimuthally from the former.

In this regard, the term "helical path" shall be understood for the purposes of the present disclosure to encompass a path that displaces azimuthally and vertically to some respective extents, whether or not the path makes a complete revolution around the circumference of the tool. That is, a "helical path" is to be understood to include a segment of a helix centered on the long (vertical) axis of the tool and extending azimuthally either more or less than 360°. Electrodes on a pad or between any two pads may be spaced apart either azimuthally, vertically, or both azimuthally and vertically. (By definition, electrodes on two separate pads are azimuthally spaced apart.)

The measuring apparatus 10 in accordance with the disclosed embodiment of the invention includes operational circuitry, not shown in the Figures, for selectively generating signals in the form of electrical currents between respective electrodes on the plurality of pads 30, as will be hereinafter described in further detail. The operational circuitry is in most ways conventional in design, and it is believed it would be a matter of routine engineering to persons of ordinary skill in the art having the benefit of the present disclosure to design the circuitry necessary to perform the electrical functions necessary for the practice of the present invention.

Figure 5:
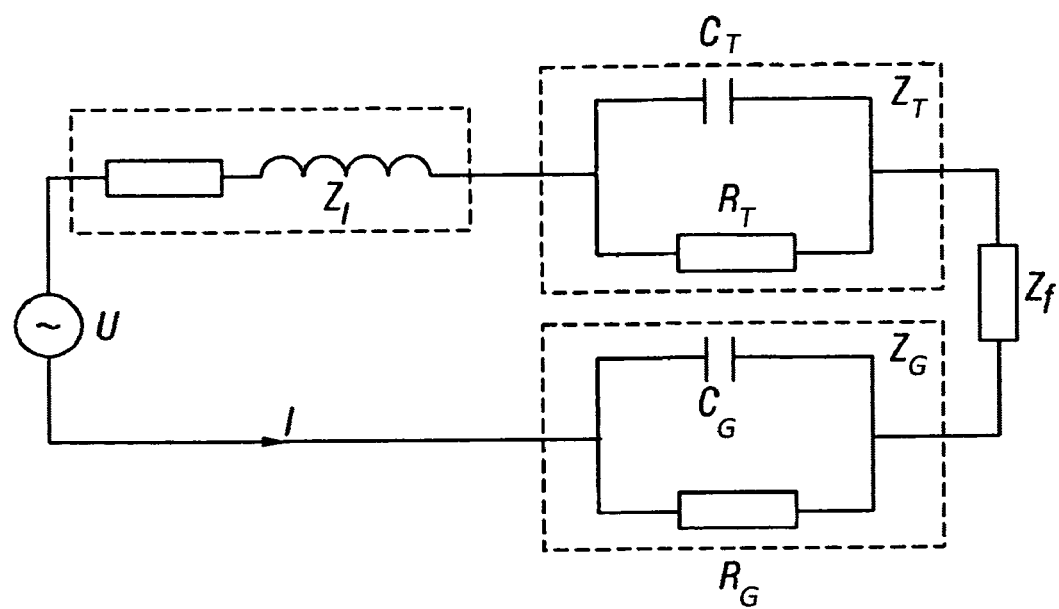
FIG. 5 is a simplified electrical schematic diagram of the earth formation evaluation operation in accordance with one embodiment of the invention.

It is to be understood that the operational circuitry for controlling apparatus 10 to function in accordance with the presently disclosed embodiment of the invention may be located entirely outside the borehole, or within the tool 10 itself, or some combination of both, in accordance with conventional design principles. A representative schematic diagram is shown in FIG. 5. The schematic of FIG. 5 shows that the resistivity measurement current depends on a number of variables, including the internal impedance of tool 10 itself, $Z_I$, the impedance due to the standoff between a transmitting electrode $Z_T$, the impedance resulting from the gap between a receiving electrode and the formation, $Z_G$, and the formation impedance $Z_F$.

With continued reference to FIG. 5, if a voltage U is the applied voltage, then the current in the circuit is given by $$I = \frac{U}{Z_I + Z_T + Z_G + Z_F}$$

As would be appreciated by those of ordinary skill in the art, the resolution of impedance measurements is highly driven by the relative contribution of the formation impedance $Z_F$ compared with the remaining impedances in the circuit. The higher the formation resistivity $Z_F$ compared with the remaining impedance, the better the resolution of the measurement to the resistivity change in the vicinity of the measurement electrodes.

In accordance with one aspect of the invention, various combinations of electrodes can be selected for performing individual resistivity measurements. Referring to FIG. 3, a rotational investigation of an earth formation can be accomplished as follows: In a first step, one pad, or, more specifically, one or more electrodes on one pad, is selected to be a current source or transmitter, and the electrodes of the remaining pads (and perhaps the remaining electrodes on the transmitting electrode's pad) are utilized as current sinks or returns. In FIG. 3, pad 30-1 is selected as the source or transmitter pad and remaining pads 30-2 through 30-6 are utilized as sink or return pads. The arrows in FIG. 2 show schematically the current paths taken by current originating from pad 30-1. In the disclosed embodiment, one or more electrodes on pad 30-1 is used to drive current, and the remaining electrodes on all pads 30 that are to be used as sensing or return electrodes are maintained at a common potential (for example, zero volts).

For a rotational measurement operation, after pad 30-1 is used as the transmitter pad and readings are made at the designated return electrodes, the next adjacent pad 30-2 is selected as the transmitter and the remaining electrodes on all pads 30 can be used as returns. Each successive pad 30 is selected in turn to be the transmitter pad, until measurements are made using pad 30-6 as the transmitter, resulting in acquisition of data comprising a "quasi-rotating" imaging of the borehole is achieved.

Those of ordinary skill will recognize that depending upon the particular electrodes on each pad used as transmitters and returns, resistivity measurements can be performed entirely azimuthally, as in where the top electrode 34 of respective pads 30 are used selectively as transmitters and returns. On the other hand, if the top electrode 34 of one pad 30 is selected as the transmitter and the bottom pads 34 of one or more of the remaining pads 30 are utilized as returns, a plurality of helical current paths are defined.

Figure 4:
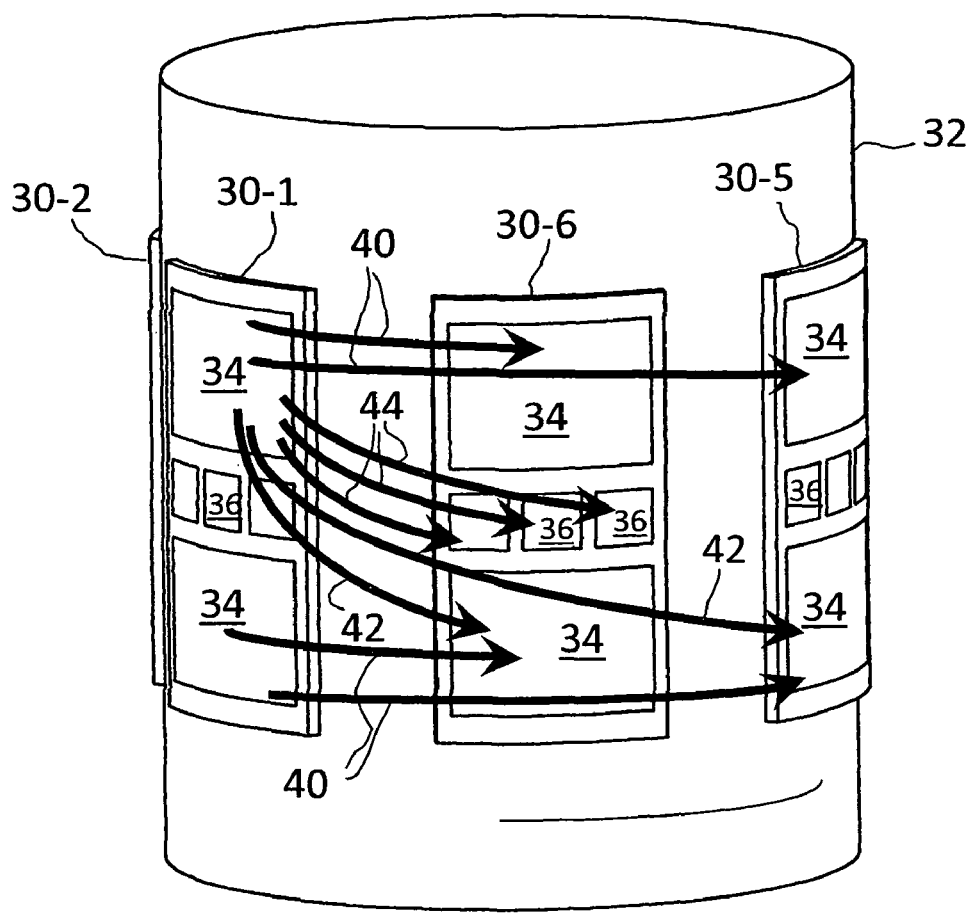
FIG. 4 is a perspective view indicating possible electrode combinations used in formation evaluation in accordance with certain embodiments of the invention.

FIG. 4 shows, non-exhaustively, a number of examples of resistivity sensing electrode configurations that are possible in the practice of the present invention. Arrows 40 show how upper or lower electrodes 34 can be used to perform strictly azimuthal sensing, i.e., using top electrode 34 of pad 30-1 as a transmitter and using top electrodes 34 of the remaining pads 30 as returns (or similarly using bottom electrode 34 of pad 30-1 as a transmitter and the remaining bottom electrodes 34 as returns).

Alternatively, arrows 42 in FIG. 4 show how helical resistivity measurement current paths—offsetting both azimuthally and vertically from transmitter to return—can be established in accordance with one aspect of the invention. As shown in FIG. 4, helical current paths 42 are realized by using one top electrode 34 (on pad 30-1 in FIG. 4) as a transmitter and using bottom electrodes 34 on the remaining pads 30 as returns.

Similarly, using top electrode 34 of pad 30-1 as a transmitter, smaller electrodes 36 on the remaining pads can be used to establish helical current paths (arrows 44 in FIG. 4) with a slightly lower pitch than helical paths 42, but with possibly greater resistivity sensing resolution owing to the size and spacing of electrodes 36.

From FIG. 4, it is apparent that there are many possible electrode combinations which can be used to perform resistivity measurements. After selecting at least one electrode on one pad to be the transmitting electrode, all remaining electrodes in device 10, both those on pads 30 other than the pad containing the transmitter as well as electrodes on the same pad as the transmitter, are available for use as return electrodes. As matter of terminology, a pad is considered the "transmitter pad" when at least one of that pad's electrodes is selected to be the transmitter electrode; in that case, each remaining pad 30 can be operated as a return pad. A pad can be both a transmitter and a return pad simultaneously, where one or more of the pad's electrodes is/are used as the transmitter(s) and one or more other electrodes on the same pad is/are used as return(s).

Also, as described above, depending upon the combination of electrodes used in a sensing operation, the area of investigation (defined as the portion of the formation through which a measurement current path passes) can be substantially horizontal, substantially vertical, or a combination of the two, i.e., where the conduction path(s) are helical. The latter case is realizable so long as at least some combination(s) of electrodes have both azimuthal and vertical offset.

The invention has been described herein as being a wireline tool that is suspended within the borehole by a suitable cable in accordance with conventional practice. It is contemplated that the invention may also be advantageously practiced in the form of a permanent downhole instrument, as is also known in the art.

As described herein, the method in accordance with the presently disclosed embodiment of the invention involves several computational steps. As would be apparent by persons of ordinary skill, these steps may be performed by computational means such as a computer, or may be performed manually by an analyst, or by some combination thereof. As an example, where the disclosed embodiment calls for a comparison of theoretical and experimental values of a variable function, it would be apparent to those of ordinary skill in the art that such comparison could be performed based upon a subjective assessment by an analyst or by computational assessment by a computer system properly programmed to perform such a function. To the extent that the present invention is implemented utilizing computer equipment to perform one or more functions, it is believed that programming computer equipment to perform these steps would be a matter of routine engineering to persons of ordinary skill in the art having the benefit of the present disclosure.

Implicit in the processing of the acquired data is the use of a computer program implemented on a suitable computational platform (dedicated or general purpose) and embodied in a suitable machine readable medium that enables the processor to perform the control and processing. The term "processor" as used in the present disclosure is intended to encompass such devices as microcontrollers, microprocessors, field-programmable gate arrays (FPGAs) and the storage medium may include ROM, RAM, EPROM, EAROM, solid-state disk, optical media, magnetic media and other media and/or storage mechanisms as may be deemed appropriate. As discussed above, processing and control functions may be performed downhole, at the surface, or in both locations.

From the foregoing disclosure, it should be apparent that a method and apparatus for evaluating an earth formation has been disclosed involving the measurement of electrical characteristics including formation resistivity.

Although a specific embodiment of the invention as well as possible variants and alternatives thereof have been described and/or suggested herein, it is to be understood that the present disclosure is intended to teach, suggest, and illustrate various features and aspects of the invention, but is not intended to be limiting with respect to the scope of the invention, as defined exclusively in and by the claims, which follow.

Indeed, it is contemplated and to be explicitly understood that various substitutions, alterations, and/or modifications, including but not limited to any such implementation variants and options as may have been specifically noted or suggested herein, including inclusion of technological enhancements to any particular method step or system component discovered or developed subsequent to the date of this disclosure, may be made to the disclosed embodiment of the invention without necessarily departing from the technical and legal scope of the invention as defined in the following claims.

What is claimed is:

1. An apparatus for evaluating an earth formation penetrated by a borehole, comprising:
a plurality of azimuthally spaced-apart pads each having at least one electrode thereon and configured to be positioned proximal to a wall of said borehole;
operational circuitry adapted to operate a first one of said electrodes as a first transmitter electrode and at least a second electrode, on a different pad than said first electrode, as a first return electrode, such that current is driven along a first current path between said first transmitter electrode and said first return electrode, resulting in a first measurement signal being detectable at said first return electrode;
processing circuitry for determining a first property of said earth formation based at least in part on said current on said first current path and said first measurement signal; wherein
one electrode on each one of said plurality of pads is separately selected, in a predetermined sequence of said pads, to transmit current conducted from the selected pad to at least one other one of said plurality of pads.

2. The apparatus of claim 1, wherein said operational circuitry is further adapted to operate a third one of said electrodes as a second transmitter electrode and at least a fourth electrode, on a different pad than said third electrode, as a second return electrode, such that current is driven along a second current path between said second transmitter electrode and said second return electrode, resulting in a second measurement signal being detectable at said second return electrode;
and wherein said processing circuitry is further adapted to determine a second property of said earth formation based at least in part on said current on said second current path and said second measurement signal.

3. The apparatus of claim 1, wherein current is driven from said first transmitter electrode pad to plurality of return electrodes.

4. The apparatus of claim 3, wherein said plurality of return electrodes are disposed on at least two separate pads.

5. The apparatus of claim 3, wherein current is driven from said second transmitter electrode to plurality of return electrodes.

6. The apparatus of claim 2, wherein said first pad and said second pad are adjacent to one another.

7. The apparatus of claim 1, wherein said first current path is substantially helical.

8. The apparatus of claim 1, wherein when each pad is selected to transmit a current, said current travels to a plurality of unselected ones of said plurality of pads.

9. The apparatus of claim 1, wherein said predetermined sequence comprises a succession of adjacent pads around the circumference of said apparatus.

10. An apparatus for evaluating an earth formation penetrated by a borehole, comprising:
a plurality of azimuthally spaced-apart pads each having at least two electrodes thereon, said at least two electrodes on each pad being vertically spaced apart from one another, said at least two electrodes on each of said plurality of pads configured to be positioned proximal to a wall of said borehole;
operational circuitry for driving electrical current from a transmitting electrode on a first of said plurality of pads to at least one receiving electrode on at least a second one of said plurality of pads, resulting in a separate measurement signal being produced on said at least one receiving electrode;
wherein said transmitting electrode is azimuthally displaced from said at least one receiving electrode, defining an azimuthal path between said transmitting electrode and said at least one receiving electrode; and
one electrode on each one of said plurality of pads is separately selected, in a predetermined sequence of said pads, as said transmitting electrode.

11. The apparatus of claim 10, wherein said transmitting electrode is vertically displaced from said at least one receiving electrode, defining a substantially helical current path between said transmitting electrode and said at least one receiving electrode.

12. A method for evaluating an earth formation penetrated by a borehole, comprising:

positioning a plurality of azimuthally spaced-apart pads each having at least one electrode thereon proximal to a wall of said borehole;

operating a first one of said electrodes as a first transmitter electrode and at least a second electrode as a first return electrode, such that current is driven along a first current path between said first transmitter electrode and said first return electrode, resulting in a first measurement signal being detectable at said first return electrode;

further operating third one of said electrodes as a second transmitter electrode and at least a fourth electrode as a second return electrode, such that current is driven along a second current path between said second transmitter electrode and said second return electrode, resulting in a second measurement signal being detectable at said second return electrode;

determining a first property of said earth formation based at least in part on said current on said first current path and said first measurement signal, and determining a second property of said earth formation based at least in part on said current on said second current path and said second measurement signal; and selecting in a predetermined sequence a plurality of said pads, and when each pad is selected, transmitting current conducted from the selected pad to at least one other one of said plurality of pads.

13. The method of claim 12, wherein at least one of said first path and said second path is substantially helical.

14. The method of claim 12, wherein when each pad is selected to transmit a current, said current travels to a plurality of other ones of said predetermined pads.

15. The method of claim 12, wherein said predetermined sequence comprises a succession of adjacent pads around the circumference of said apparatus.

\* \* \* \* \*